US012637325B2

(12) United States Patent
Wos et al.

(10) Patent No.: US 12,637,325 B2
(45) Date of Patent: May 26, 2026

(54) SENSOR-BASED SHUTDOWN DETECTION OF ELEVATOR SYSTEM

(71) Applicant: Otis Elevator Company, Farmington, CT (US)

(72) Inventors: Lindsay Wos, Florence, SC (US); Nikola Trcka, West Hartford, CT (US); Sally Day Mahoney, New Hartford, CT (US); Leslie Lamontagne, Prospect, CT (US); Sandeep Sudi, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1640 days.

(21) Appl. No.: 16/135,547

(22) Filed: Sep. 19, 2018

(65) Prior Publication Data

US 2020/0087111 A1 Mar. 19, 2020

(51) Int. Cl.

| | |
|---|---|
| ***B66B 5/00*** | (2006.01) |
| ***B66B 1/34*** | (2006.01) |
| ***B66B 3/02*** | (2006.01) |

(52) U.S. Cl.

CPC .......... *B66B 5/0025* (2013.01); *B66B 1/3461* (2013.01); *B66B 3/02* (2013.01); *B66B 5/0012* (2013.01)

(58) Field of Classification Search

CPC ......... B66B 13/24; B66B 5/00; B66B 5/0006; B66B 5/0018; B66B 5/0031; B66B 5/02; B66B 5/027

See application file for complete search history.

(56) References Cited

U.S. PATENT DOCUMENTS

| | | | |
|---|---|---|---|
| 4,246,983 A | | 1/1981 | Bril |
| 4,512,442 A | | 4/1985 | Moore et al. |
| 4,622,538 A | * | 11/1986 | Whynacht ............ B66B 5/0037 702/182 |
| 4,898,263 A | | 2/1990 | Manske et al. |
| 4,930,604 A | | 6/1990 | Schienda et al. |
| 5,765,664 A | | 6/1998 | Herkel et al. |
| 6,591,947 B2 | | 7/2003 | Horbrugger et al. |
| 7,448,473 B2 | | 11/2008 | Lindberg et al. |

(Continued)

FOREIGN PATENT DOCUMENTS

| | | |
|---|---|---|
| CN | 102633173 A | 8/2012 |
| CN | 202848789 U | 4/2013 |

(Continued)

OTHER PUBLICATIONS

Merriam-Webster Dictionary. Dictionary Definition “any”. [online] Retrieved from the Internet Dec. 19, 2025. <https://www.merriam-webster.com/dictionary/any> (Year: 2025).*

(Continued)

*Primary Examiner* — Christopher Uhlir

(74) *Attorney, Agent, or Firm* — CANTOR COLBURN LLP

(57) ABSTRACT

An elevator system includes an elevator car configured to travel in a hoistway, the elevator car including an elevator car door; a controller configured to control motion of the elevator car; at least one sensor configured to sense an operating condition of the elevator system; and a sensor interface configured to detect a shutdown state of the elevator system in response to the operating condition.

16 Claims, 5 Drawing Sheets

(56) References Cited

U.S. PATENT DOCUMENTS

| | | | |
|---|---|---|---|
| 7,849,975 B2 | 12/2010 | Ketonen et al. |
| 9,580,276 B2 | 2/2017 | Toutaoui |
| 9,734,003 B2 | 8/2017 | Sekine et al. |
| 2003/0192746 A1 | 10/2003 | Suzuki |
| 2008/0091278 A1 | 4/2008 | Reynolds |
| 2017/0349398 A1 | 12/2017 | Toutaoui |
| 2017/0355554 A1 | 12/2017 | Eleid et al. |

FOREIGN PATENT DOCUMENTS

| | | | |
|---|---|---|---|
| CN | 104627769 A | 5/2015 |
| CN | 107416630 A | 12/2017 |
| CN | 108163659 A | 6/2018 |
| DE | 202014010508 U1 | 12/2015 |
| EP | 2246285 A1 | 11/2010 |
| EP | 3190075 A1 | 7/2017 |
| EP | 3543191 A2 | 9/2019 |
| EP | 3575258 A1 | 12/2019 |
| JP | H04029555 B2 | 1/1992 |
| JP | 2007217138 A | 8/2007 |

OTHER PUBLICATIONS

European Search Report for application EP 19198464.0, dated Mar. 18, 2020, 26 pages.

Qameleon "QarVision Remote Elevator Monitor Sample Installations", www.qameleon.com/protected/ems_install.htm Nov. 3, 2012, 2 pages.

Skog, Isaac, "A Smart Sensor Node for the Internet-of-Elevators-Non-Invasive Condition and Fault Monitoring", IEEE Sensors Journal, vol. 17, No. 16, 2017, 2 pages.

* cited by examiner

Shutdown State Conditions (occur simultaneously)

- Elevator is between landings AND
- Elevator is in a stopped state (not moving) AND
- Elevator not parked intentionally Exit Shutdown State Conditions

- Doors open at a landing OR
- Car is moving

Shutdown state on sequence of:

1. Car is stopped at a landing
2. Doors open
3. Doors close
4. Motion is detected inside the car
5. Doors open at the same landing
6. Repeat a number of times Exit Shutdown state condition

- Car is moving

Shutdown state on sequence of:

1. Car is moving
2. Passenger status indicates that the car is occupied
3. Car stops at landing
4. Doors do not open for a period of time Exit Shutdown state condition

- Doors open OR
- Car is moving

SENSOR-BASED SHUTDOWN DETECTION OF ELEVATOR SYSTEM

BACKGROUND

The embodiments described herein relate generally to an elevator system, and more particularly to an elevator system using sensor-based shutdown detection.

Elevator systems will occasionally enter a shutdown state due to various events, such as an overspeed condition, machine fault, controller fault, etc. In some situations, maintenance personnel do not have access to the elevator controller in order to determine the exact state of the elevator system. This may occur when the maintenance personnel are not affiliated with the manufacturer of the elevator system. In these situations, the maintenance personnel can find it difficult to determine the current state of the elevator system.

SUMMARY

According to an embodiment, an elevator system includes an elevator car configured to travel in a hoistway, the elevator car including an elevator car door; a controller configured to control motion of the elevator car; at least one sensor configured to sense an operating condition of the elevator system; and a sensor interface configured to detect a shutdown state of the elevator system in response to the operating condition.

In addition to one or more of the features described herein, or as an alternative, further embodiments may include wherein the at least one sensor comprises a plurality of sensors configured to sense a plurality of operating conditions of the elevator system; wherein the sensor interface is configured to detect the shutdown state of the elevator system in response to the plurality of operating conditions.

In addition to one or more of the features described herein, or as an alternative, further embodiments may include wherein the plurality of sensors comprise a position sensor, movement sensor, elevator car door sensor and an occupancy sensor.

In addition to one or more of the features described herein, or as an alternative, further embodiments may include wherein the sensor interface is configured to detect the shutdown state of the elevator system in response to the elevator car being positioned between landings, the elevator car being stopped and the elevator car not intentionally parked between landings.

In addition to one or more of the features described herein, or as an alternative, further embodiments may include wherein the sensor interface is configured to exit the shutdown state in response to the elevator car door being open at a landing or the elevator car moving.

In addition to one or more of the features described herein, or as an alternative, further embodiments may include wherein the elevator car intentionally parked between landings is determined by one or more of: an indication that a mechanic is in a building; the elevator car had previously been running at a low speed profile indicative of inspection mode; a detection of a mechanic tool by the sensor interface; or a GPS location of a mechanic in the building.

In addition to one or more of the features described herein, or as an alternative, further embodiments may include wherein the sensor interface is configured to detect the shutdown state of the elevator system in response to the elevator car stopped at a landing, the elevator car door opening, the elevator car door closing, occupancy detected in the elevator car and the elevator car door opening, occurring in sequence a number of times.

In addition to one or more of the features described herein, or as an alternative, further embodiments may include wherein the sensor interface is configured to exit the shutdown state in response to the elevator car moving.

In addition to one or more of the features described herein, or as an alternative, further embodiments may include wherein the sensor interface is configured to detect the shutdown state of the elevator system in response to the elevator car moving, occupancy detected in the elevator car, the elevator car stopping at a landing and the elevator car door not opening for a period of time, occurring in sequence.

In addition to one or more of the features described herein, or as an alternative, further embodiments may include wherein the sensor interface is configured to exit the shutdown state in response to the elevator car door opening or the elevator car moving.

In addition to one or more of the features described herein, or as an alternative, further embodiments may include wherein the sensor interface is configured to send at least one of the operating condition and the shutdown state to a remote device.

According to another embodiment, a method of detecting a state of an elevator system including elevator car configured to travel in a hoistway, the elevator car including an elevator car door and a controller configured to control motion of the elevator car, the method including using at least one sensor to sense an operating condition of the elevator system; and at a sensor interface, detecting a shutdown state of the elevator system in response to the operating condition.

In addition to one or more of the features described herein, or as an alternative, further embodiments of the method may include wherein sensing the operating condition of the elevator system comprises sensing a plurality of operating conditions of the elevator system; wherein the sensor interface is configured to detect the shutdown state of the elevator system in response to the plurality of operating conditions.

In addition to one or more of the features described herein, or as an alternative, further embodiments of the method may include wherein the plurality of operating conditions comprise a position, movement, elevator car door status and occupancy of the elevator car.

In addition to one or more of the features described herein, or as an alternative, further embodiments of the method may include detecting the shutdown state of the elevator system in response to the elevator car being positioned between landings, the elevator car being stopped and the elevator car not intentionally parked between landings.

In addition to one or more of the features described herein, or as an alternative, further embodiments of the method may include exiting the shutdown state in response to the elevator car door being open at a landing or the elevator car moving.

In addition to one or more of the features described herein, or as an alternative, further embodiments of the method may include wherein the elevator car intentionally parked between landings is determined by one or more of: an indication that a mechanic is in a building; the elevator car had previously been running at a low speed profile indicative of inspection mode; a detection of a mechanic tool by the sensor interface; or a GPS location of a mechanic in the building.

In addition to one or more of the features described herein, or as an alternative, further embodiments of the method may include detecting the shutdown state of the elevator system in response to the elevator car stopped at a landing, the elevator car door opening, the elevator car door closing, occupancy detected in the elevator car and the elevator car door opening, occurring in sequence a number of times.

In addition to one or more of the features described herein, or as an alternative, further embodiments of the method may include exiting the shutdown state in response to the elevator car moving.

In addition to one or more of the features described herein, or as an alternative, further embodiments of the method may include detecting the shutdown state of the elevator system in response to the elevator car moving, occupancy detected in the elevator car, the elevator car stopping at a landing and the elevator car door not opening for a period of time, occurring in sequence.

In addition to one or more of the features described herein, or as an alternative, further embodiments of the method may include exiting the shutdown state in response to the elevator car door opening or the elevator car moving.

In addition to one or more of the features described herein, or as an alternative, further embodiments of the method may include wherein the sensor interface is configured to send at least one of the operating condition and the shutdown state to a remote device.

Technical effects of embodiments of the present disclosure include the ability to determine a shutdown state of an elevator system, without having access to the elevator controller, using sensors mounted in the elevator system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
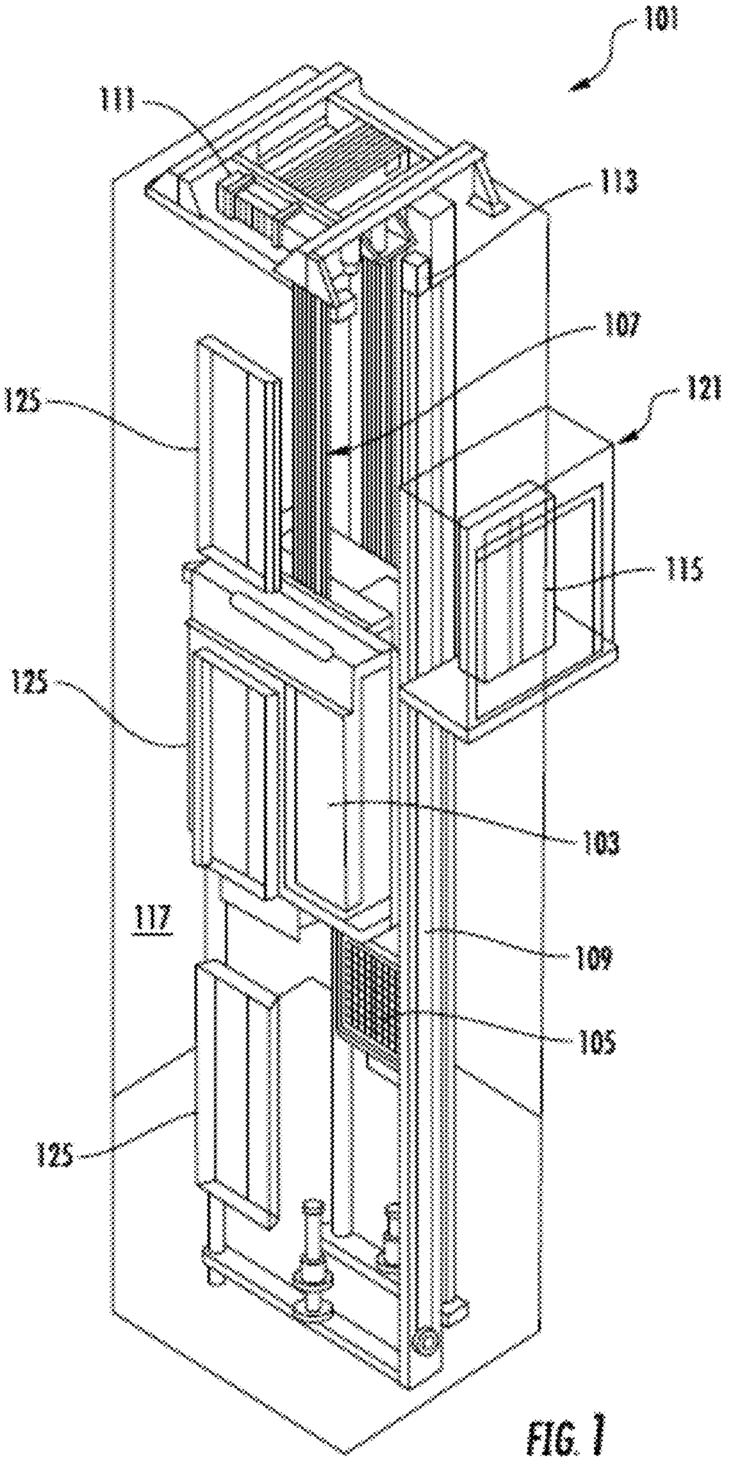
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
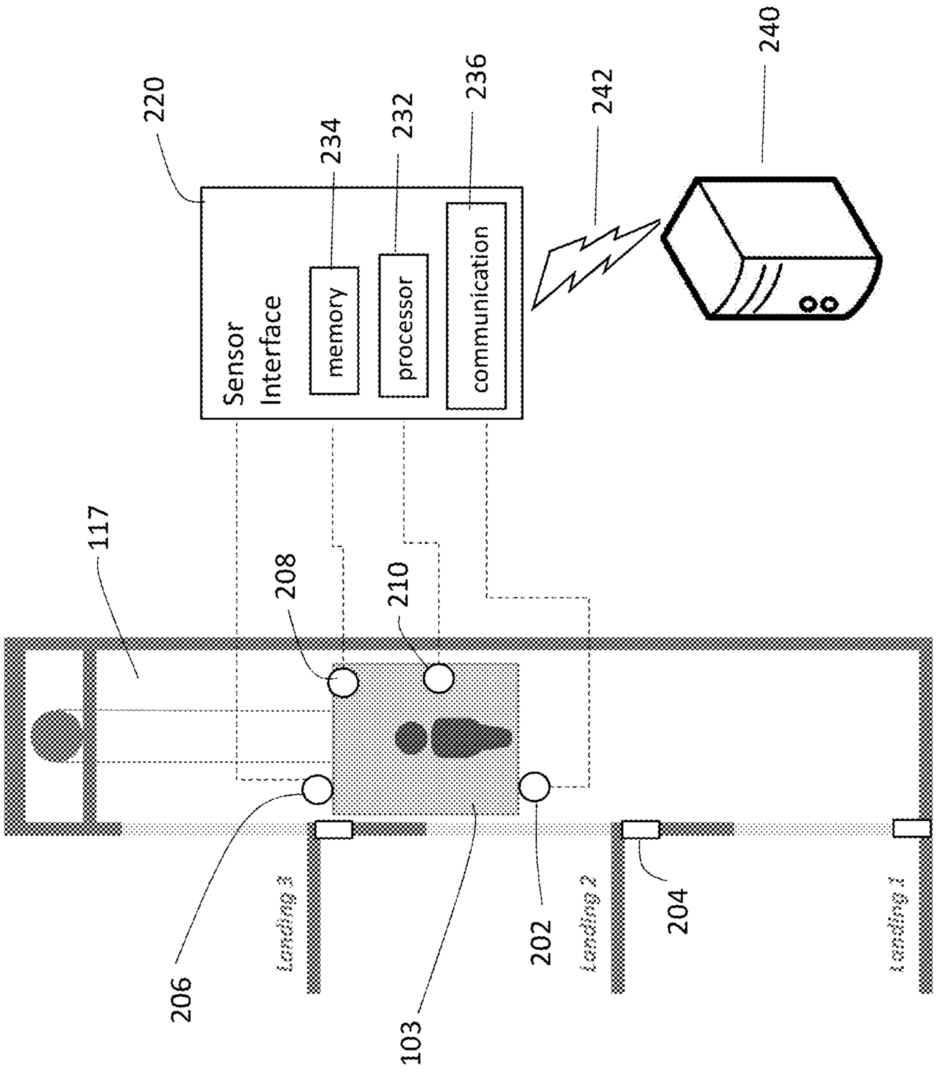
FIG. 2 depicts sensors installed in an elevator system in an example embodiment.

FIG. 2 depicts sensors installed in an elevator system in an example embodiment. The sensors are used to collect operating conditions of the elevator system. The operating conditions of the elevator system are then examined to determine if the elevator system is in a shutdown state. A first sensor 202 is mounted to the elevator car 103 and functions as an elevator car position sensor. The first sensor 202 may read indicia 204 positioned along the hoistway 117. The indicia 204 may correspond to unique landing floors. In an example embodiment, the first sensor is an RFID reader the reads RFID tags 204 located along the hoistway 117 (e.g., on a guide rail) to determine location of the elevator car 103. It is understood that other types of sensors and indicia may be used.

A second sensor 206 functions as motion sensor to determine if the elevator car 103 is moving or stopped. The second sensor 206 may be an accelerometer mounted on the top of the elevator car 103 and senses vibration when the elevator car 103 is moving. It is understood that other types of motion sensors may be used.

A third sensor 208 detects the status of the elevator car door(s), including an open position and a closed position. The third sensor 208 may be implemented using two sensors, with one sensor located at each travel limit of the elevator door(s). In one embodiment, hall-effect sensors are used to detect if the elevator door(s) are opened or closed. It is understood that other types of sensors may be used to detect door position.

A fourth sensor 210 detects occupancy of the elevator car 103. The fourth sensor 210 may detect presence of one or more persons in the elevator car 103 using thermal sensing, audio sensing, image sensing, weight sensing, etc.

The sensors 202, 206, 208 and 210 are only examples of sensors that may be added to the elevator system in order to sense operating conditions of the elevator system. Other sensors may be installed at various locations to monitor other operating conditions of the elevator system. Additionally, one sensor may be used to perform multiple functions. For example, a single sensor could be used to determine the functions for sensors 202, 206 and 208, or a single sensor could be used for all functions, 202, 206, 208 and 210.

The sensors 202, 206, 208 and 210 provide respective sensed operating conditions to a sensor interface 220. The sensor interface 220 may include a processor 232, a memory 234, and a communication module 236 as shown in FIG. 2. The processor 232 can be any type or combination of computer processors, such as a microprocessor, microcontroller, digital signal processor, application specific integrated circuit, programmable logic device, and/or field programmable gate array. The memory 234 is an example of a non-transitory computer readable storage medium tangibly embodied in the sensor interface 220 including executable instructions stored therein, for instance, as firmware. The communication module 236 may implement one or more communication protocols to communicate with external devices.

The sensor interface 220 may communicate with an external device 240 over network 242. The external device 240 may be a processor-based device such as a laptop computer, tablet, PDA, a remote server or cloud application, etc. The network 242 may be a wireless network, such as 802.11x (WiFi), short-range radio (Bluetooth), or any other known type of wireless communication such as cellular. The network 242 may also include wired network elements, such as LAN, WAN, etc. The network 242 may also be implemented using a physical interface, such as wired connection using an Ethernet cable, coaxial cable, or other data cable that connects a port on the sensor interface 220 and the external device 240. Using the external device 240, personnel can access the sensor interface 220 over network 242 and retrieve the current state of the elevator system, along with the sensed conditions from sensors 202, 206, 208 and 210.

Figure 3:
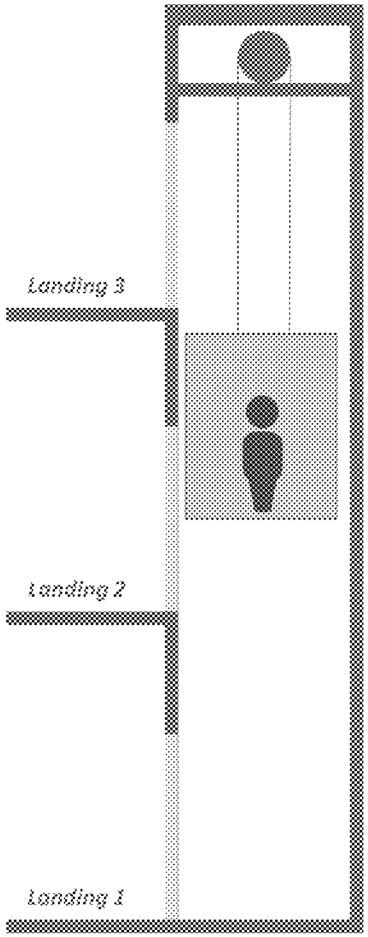
FIG. 3 depicts sensed operating conditions indicating a shutdown state in an example embodiment.
Figure 4:
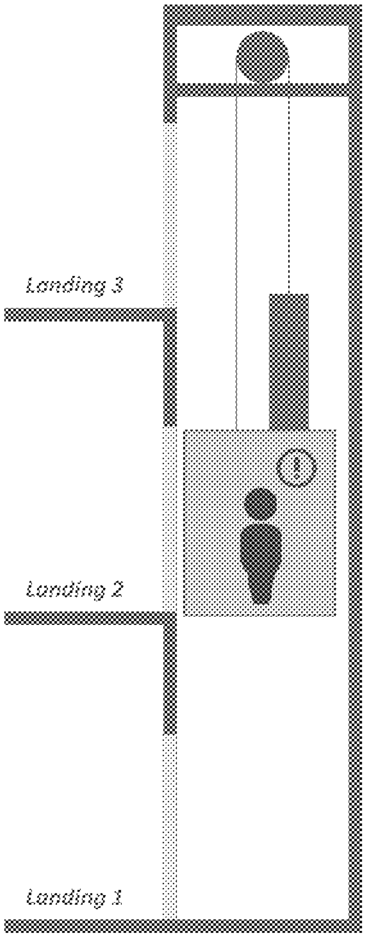
FIG. 4 depicts sensed operating conditions indicating a shutdown state in an example embodiment.
Figure 5:
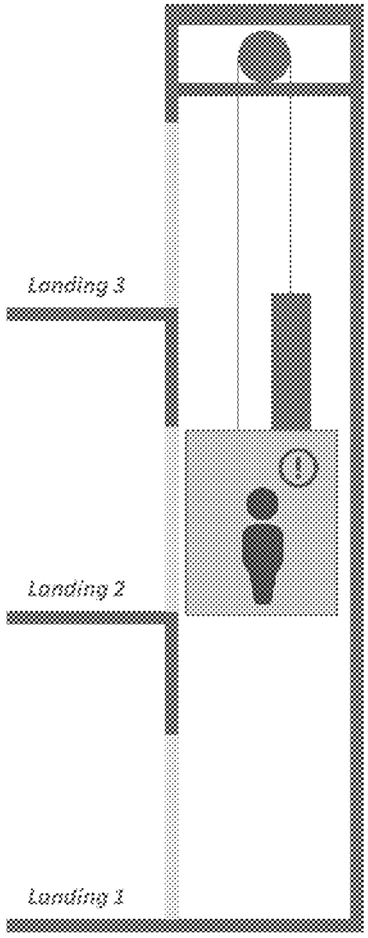
FIG. 5 depicts sensed operating conditions indicating a shutdown state in an example embodiment.

In operation, the sensor interface 220 collects sensed operating conditions from the sensors 202, 206, 208 and 210 and stores the sensed operating conditions in memory 234, along with a time stamp of when each sensed operating condition occurred. The sensor interface 220 may execute a process to detect a shutdown state of the elevator system. The sensor interface may be located in a variety of locations such as on the elevator car 103, in a control room, in the cloud, etc. FIGS. 3-5 provide examples of detecting a shutdown state of the elevator system.

FIG. 3 depicts sensed operating conditions indicating a shutdown state in an example embodiment. In the example in FIG. 3, the shutdown state corresponds to an elevator car between landings. Both occupied and unoccupied shutdown states can be reported depending on whether sensor 210 indicates passenger(s) in the elevator car. To enter the shutdown state, the elevator car is between landings and the elevator car is in a stopped state (not moving) and the elevator car was not parked in that location intentionally. If these three conditions exist for a configurable period of time (e.g., 5 seconds) then the sensor interface 220 concludes that the elevator system is in a shutdown state with an elevator car between landings. The sensor interface 220 may store a log of the shutdown state in memory 234. To exit the shutdown state, either the car doors are detected as opening at a landing or the elevator car moves. The sensor interface 220 can detect when the elevator car is intentionally parked between landings by filtering out conditions of an elevator car stopping between floors that are not shutdowns, such as a mechanic operating the elevator on inspection mode. This may be done by various techniques such as an indication that a mechanic is in a building served by the elevator system (e.g., badge detection), a low speed profile, the connection of a mechanic tool to the sensor interface 220 or the GPS location of a mechanic in the building.

FIG. 4 depicts sensed operating conditions indicating a shutdown state in an example embodiment. In the example in FIG. 4, the shutdown state corresponds to an elevator car in a shutdown state at a landing before an elevator run commences. Both occupied and unoccupied shutdown states can be reported depending on whether sensor 210 indicates passenger(s) in the elevator car. To enter the shutdown state, the elevator car stops at a landing, the elevator car door(s) open, the elevator car door(s) close, motion is detected inside the elevator car and the elevator car door(s) open at the same landing. If this sequence of operating conditions is detected a configurable number of times (e.g., 5 times), then the sensor interface 220 concludes that the elevator system is in a shutdown state at a landing. The sensor interface 220 may store a log of the shutdown state in memory 234. To exit the shutdown state, the elevator car moves.

FIG. 5 depicts sensed operating conditions indicating a shutdown state in an example embodiment. In the example in FIG. 5, the shutdown state corresponds to an elevator car in a shutdown state at a landing after an elevator run. To enter the shutdown state, the elevator car is first moving, the passenger status indicates that the elevator car is occupied, the elevator car stops at landing and the elevator car doors do not open for an extended period of time (e.g., 30 seconds). If this sequence of operating conditions is detected, then the sensor interface 220 concludes that the elevator system is in a shutdown state at a landing while occupied. The sensor interface 220 may store a log of the shutdown state in memory 234. To exit the shutdown state, either the elevator car doors open or the elevator car moves.

Embodiments allow maintenance personnel to determine if an elevator system is in a shutdown state without having to access the elevator controller 115. This can be helpful when the maintenance personnel is not affiliated with the manufacturer of the elevator system. Embodiments also include sending the sensor information and/or the shutdown state to a remote server or cloud, which may be implemented by external device 240 or another device. Elevator information calculated by the sensor interface 220 may also be sent to the remote server or cloud with the shutdown state. In other embodiments, the sensor information may be sent to a remote server or cloud on a periodic basis to verify elevator operation. Examples of elevator information calculated by the sensor interface includes elevator speed, elevator position (mm or floor number) of the elevator, whether the elevator is at a landing or between landings, door state, passenger status, etc. Other information that may be sent with the shutdown state is the condition leading up to the shutdown such as elevator speed, starting landing, distance or time from the starting landing, direction of travel, etc. The service provider will use the shutdown state and additional information to dispatch a mechanic to address the shutdown or release a trapped passenger. A dispatch can be cancelled if the shutdown clears. If the elevator sensor information is sent periodically to the remote server or cloud, the information may also be used to provide additional information for dispatching mechanics for a customer complaint such as elevator position, or to determine that an elevator is functioning correctly. The sensors 202, 206, 208 and 210 and sensor interface 220 may be added after the initial installation of the elevator system.

As described above, embodiments can be in the form of processor-implemented processes and devices for practicing those processes, such as a processor in the sensor interface. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising:

an elevator car configured to travel in a hoistway, the elevator car including an elevator car door;

a controller configured to control motion of the elevator car;

at least one sensor configured to sense an operating condition of the elevator system; and a sensor interface configured to detect a shutdown state of the elevator system in response to the operating condition;

wherein the sensor interface is configured to detect the shutdown state of the elevator system in response to at least one of the following:

(i) the elevator car stopped at a landing, the elevator car door opening, the elevator car door closing, occupancy detected in the elevator car and the elevator car door opening, occurring in sequence a number of times;

(i) the elevator car moving, occupancy detected in the elevator car, the elevator car stopping at a landing and the elevator car door not opening for a period of time, occurring in sequence;

wherein the sensor interface is configured to detect the shutdown state of the elevator system in response to the elevator car stopped at a landing, the elevator car door opening, the elevator car door closing, occupancy detected in the elevator car and the elevator car door opening, occurring in sequence a number of times.

2. The elevator system of claim 1 wherein:

the at least one sensor comprises a plurality of sensors configured to sense a plurality of operating conditions of the elevator system;

wherein the sensor interface is configured to detect the shutdown state of the elevator system in response to the plurality of operating conditions.

3. The elevator system of claim 2 wherein:

the plurality of sensors comprise a position sensor, movement sensor, elevator car door sensor and an occupancy sensor.

4. The elevator system of claim 1 wherein:

the sensor interface is configured to detect the shutdown state of the elevator system in response to the elevator car being positioned between landings, the elevator car being stopped and the elevator car not intentionally parked between landings.

5. The elevator system of claim 4 wherein:

the sensor interface is configured to exit the shutdown state in response to the elevator car door being open at a landing or the elevator car moving.

6. The elevator system of claim 1 wherein:

the sensor interface is configured to exit the shutdown state in response to the elevator car moving.

7. The elevator system of claim 1 wherein:

the sensor interface is configured to exit the shutdown state in response to the elevator car door opening or the elevator car moving.

8. The elevator system of claim 1 wherein:

the sensor interface is configured to send at least one of the operating condition and the shutdown state to a remote device.

9. A method of detecting a state of an elevator system including elevator car configured to travel in a hoistway, the elevator car including an elevator car door and a controller configured to control motion of the elevator car, the method comprising:

using at least one sensor to sense an operating condition of the elevator system; and detecting a shutdown state of the elevator system, at a sensor interface, in response to the operating condition;

wherein detecting the shutdown state of the elevator system is in response to at least one of the following:

(i) the elevator car stopped at a landing, the elevator car door opening, the elevator car door closing, occupancy detected in the elevator car and the elevator car door opening, occurring in sequence a number of times;

or (ii) the elevator car moving, occupancy detected in the elevator car, the elevator car stopping at a landing and the elevator car door not opening for a period of time, occurring in sequence;

the method further comprising detecting the shutdown state of the elevator system in response to the elevator car stopped at a landing, the elevator car door opening, the elevator car door closing, occupancy detected in the elevator car and the elevator car door opening, occurring in sequence a number of times.

10. The method of claim 9 wherein:

sensing the operating condition of the elevator system comprises sensing a plurality of operating conditions of the elevator system;

wherein the sensor interface is configured to detect the shutdown state of the elevator system in response to the plurality of operating conditions.

11. The method of claim 10 wherein:

the plurality of operating conditions comprise a position, movement, elevator car door status and occupancy of the elevator car.

12. The method of claim 9 further comprising:

detecting the shutdown state of the elevator system in response to the elevator car being positioned between landings, the elevator car being stopped and the elevator car not intentionally parked between landings.

13. The method of claim 12 further comprising:

exiting the shutdown state in response to the elevator car door being open at a landing or the elevator car moving.

14. The method of claim 9 further comprising:

exiting the shutdown state in response to the elevator car moving.

15. The method of claim 9 further comprising:

exiting the shutdown state in response to the elevator car door opening or the elevator car moving.

16. The method of claim 9 wherein:

the sensor interface is configured to send at least one of the operating condition and the shutdown state to a remote device.

* * * * *